US012371938B2

(12) United States Patent
Valter et al.

(10) Patent No.: US 12,371,938 B2
(45) Date of Patent: Jul. 29, 2025

(54) HINGE ASSEMBLY

(71) Applicant: TITUS D.O.O. DEKANI, Dekani (SI)

(72) Inventors: Svara Valter, Izola (SI); David Pecar, Pobegi (SI); Migli Carlo, Lecco LC (IT)

(73) Assignee: TITUS D.O.O. DEKANI, Dekani (SI)

( * ) Notice: Subject to any disclaimer, the term of this patent is extended or adjusted under 35 U.S.C. 154(b) by 3 days.

(21) Appl. No.: 18/273,483

(22) PCT Filed: Jan. 13, 2022

(86) PCT No.: PCT/EP2022/050677

§ 371 (c)(1),
(2) Date: Jul. 20, 2023

(87) PCT Pub. No.: WO2022/157071

PCT Pub. Date: Jul. 28, 2022

(65) Prior Publication Data

US 2024/0125160 A1 Apr. 18, 2024

(30) Foreign Application Priority Data

Jan. 25, 2021 (GB) ..................................... 2100973

(51) Int. Cl.
*E05F 1/08* (2006.01)
*E05D 3/12* (2006.01)
(Continued)

(52) U.S. Cl.
CPC .................. *E05F 5/02* (2013.01); *E05D 3/12* (2013.01); *E05D 5/0276* (2013.01); *E05F 5/006* (2013.01);
(Continued)

(58) Field of Classification Search
CPC ........... E05Y 2900/20; E05Y 2900/202; E05Y 2900/204; E05Y 2900/208; E05Y 2201/20;
(Continued)

(56) References Cited

U.S. PATENT DOCUMENTS 9,115,525 B2 * 8/2015 Zimmer .................... E05F 5/08
2009/0119875 A1 * 5/2009 Migli ...................... E05F 5/006 16/233
(Continued)

FOREIGN PATENT DOCUMENTS

EP 2060719 A2 5/2009
EP 1931850 B1 8/2011
(Continued)

OTHER PUBLICATIONS

International Search Report issued in corresponding International Application No. PCT/EP2022/050677 mailed Apr. 22, 2022 (5 pages).
(Continued)

*Primary Examiner* — Chuck Y Mah
(74) *Attorney, Agent, or Firm* — Lathrop GPM LLP

(57) ABSTRACT

A hinge assembly including a hinge cup, a hinge arm and a hinge lever pivotally connected to both the hinge cup and the hinge arm so as to connect the two together. The assembly further including a damping device and an actuator assembly operable to activate the damping device as the hinge assembly moves from an open position to a closed position. The actuator assembly is operable to move from a second position to a first position to actuate the damping device, where the hinge arm engages with the actuator assembly to cause said movement from the second position to the first position.

14 Claims, 4 Drawing Sheets

(51) Int. Cl.
*E05D 5/02* (2006.01)
*E05F 5/00* (2017.01)
*E05F 5/02* (2006.01)

(52) U.S. Cl.
CPC ... *E05Y 2201/256* (2013.01); *E05Y 2201/264* (2013.01); *E05Y 2201/638* (2013.01); *E05Y 2900/20* (2013.01)

(58) Field of Classification Search
CPC ........... E05Y 2201/21; E05Y 2201/261; E05Y 2201/11; E05Y 2201/258; E05Y 2201/256; E05Y 2201/264; E05Y 2201/638; E05Y 2201/46; E05Y 2201/474; E05Y 16/286; E05F 5/006; E05F 5/02; E05F 5/027; E05D 11/0054; E05D 11/1021; E05D 11/1042; E05D 11/105; E05D 11/1064; E05D 7/04; E05D 7/0407; E05D 7/123; E05D 7/125; E05D 3/142; E05D 3/12; E05D 5/0276
See application file for complete search history.

(56) References Cited

U.S. PATENT DOCUMENTS

2009/0119876 A1* 5/2009 Pecar ...................... E05D 3/142 16/293
2010/0139041 A1* 6/2010 Pecar ...................... E05F 5/006 16/273
2014/0165333 A1* 6/2014 Brunnmayr ............... F16F 9/08 188/269
2016/0010380 A1* 1/2016 Svara ...................... E05D 3/142 16/349
2017/0022744 A1* 1/2017 Migli .................. E05D 11/0054
2017/0175430 A1* 6/2017 Svara ........................ F16F 9/19
2018/0328093 A1* 11/2018 Zimmer .................... E05F 5/02
2018/0355651 A1* 12/2018 Liang ...................... E05D 11/00
2020/0318411 A1* 10/2020 Pecar ........................ E05F 3/20

FOREIGN PATENT DOCUMENTS

IT MI20131350 A1 2/2015
WO 2015155579 A1 10/2015
WO WO-2018134020 A1 * 7/2018 ............. E05F 5/006

OTHER PUBLICATIONS

Written Opinion of the International Searching Authority issued in corresponding Application No. PCT/EP2022/050677 mailed Apr. 22, 2022 (8 pages).

* cited by examiner

Fig 5
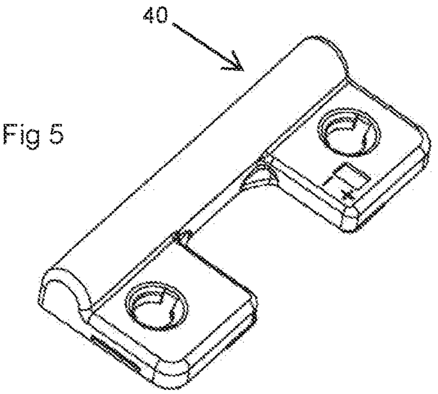
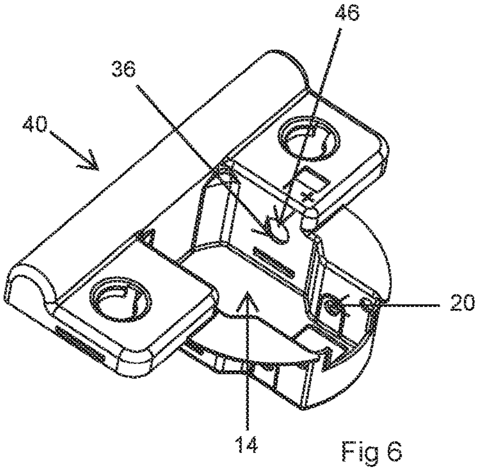
Fig 6
Fig 7
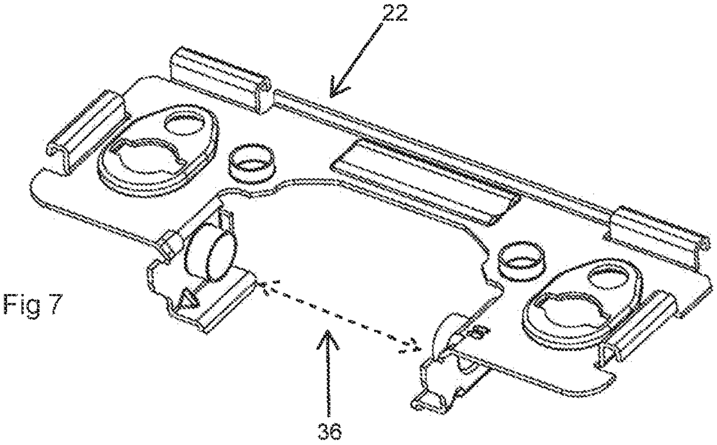
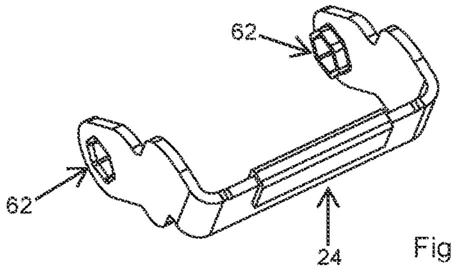
Fig 8
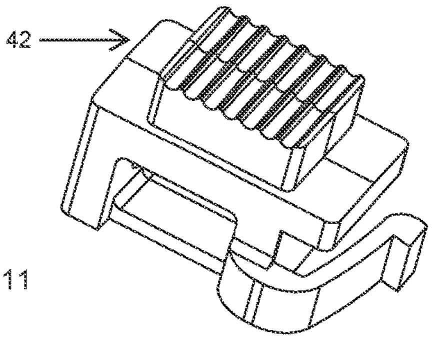
Fig 11
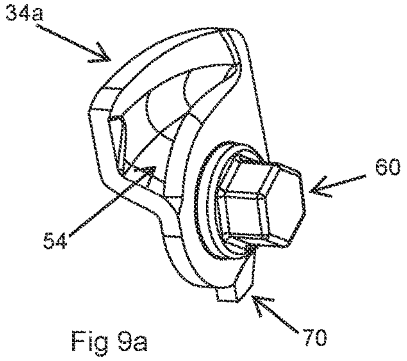
Fig 9a
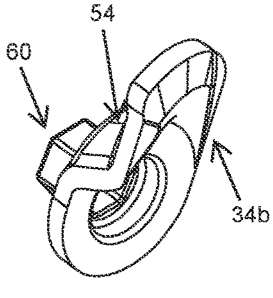
Fig 9b
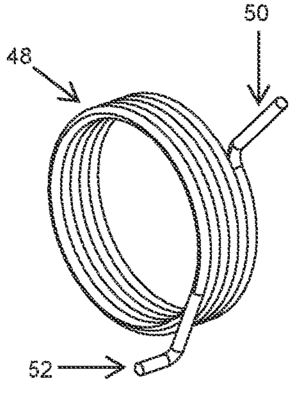
Fig 10

HINGE ASSEMBLY

This application is a U.S. National Stage of Patent Cooperation Treaty International Application Number PCT/EP2022/050677, filed 13 Jan. 2022, which claims priority to Great Britain Patent Application Number 2100973.3, filed 25 Jan. 2021, the entireties of which are hereby incorporated by reference.

The present arrangement relates to a hinge assembly.

It is desirable to provide a hinge assembly that can facilitate the soft closure of a cupboard or cabinet door. Such soft closure is achieved by the use of a damping device mounted on or in the hinge assembly.

However, it is important that the damping mechanism is provided as small as possible to take up as little room as possible inside the cabinet or cupboard. Additionally, if the damping mechanism is too large, it may protrude considerably from the hinge assembly and be prone to breakage. In such a scenario it is likely that that entire hinge assembly would need replacing.

Another important consideration is the working life of the hinge assembly. It is important that the damping device is actuated in a robust manner, such that limited stress and strain is placed on more delicate parts of the assembly.

It is also desirable to make the hinge cup as small as possible. The larger the hinge cup (particularly in the depth direction), the deeper the required drilling into the cabinet or cupboard.

For example, EP1931850 B1 to Blum provides a damping device located on a hinge mechanism. The hinge mechanism comprises a hinge arm, hinge cup and a hinge lever. Such features are known in the art. When the hinge mechanism is moved from an open position to a closed position, the hinge lever engages an actuator that activates the damping device. However, the hinge lever is pivotally connected to both the hinge cup and the hinge arm, and moves with respect to both during the opening and closing action, and as such is relatively delicate with respect to other parts of the hinge mechanism. It will be noted that the actuator is sandwiched between the hinge lever and hinge cup in the closed position.

It is desirable to address and overcome the above problems.

According to the present invention there is provided a hinge assembly comprising a hinge cup, a hinge arm, a hinge lever pivotally connected to both the hinge cup and the hinge arm so as to connect the two together, damping device and an actuator assembly operable to activate the damping device as the hinge assembly moves from an open position to a closed position, wherein the actuator assembly is operable to move from a second position to a first position to actuate the damping device, wherein the hinge arm engages with the actuator assembly to cause said movement from the second position to the first position.

By providing an arrangement whereby the hinge arm engages with the actuator assembly a more robust section of the hinge assembly is used to push the actuator assembly, and hence action the damping device. Accordingly, the working life of the hinge assembly can be lengthened.

It is preferred that the actuator assembly is operable to move from a third position to said second position, wherein the hinge lever is operable to engage the actuator assembly to cause said movement from the third position to the second position. In an embodiment, the movement from the third position to the second position does not action the damping device.

It is preferred that the actuator assembly comprises an actuator. It is also preferred that the actuator is pivotally mounted inside the hinge cup. The actuator may be coupled to a pair of actuator members. Said members may comprise a camming surface. The camming surface may comprise a variable pitch. Such an arrangement allows for the degree of damping to be varied over the closing action.

Preferably the actuator rotates about a pivot that is parallel to an axis of the hinge lever. It is also preferred that the actuator is operable to rotate in the same relative direction as the hinge arm in the closing action.

Such an arrangement is advantageous because it allows use of the hinge lever to move the actuator into position for engagement with the hinge arm. This scenario allows the actuator to be made smaller to better fit within the hinge cup. Accordingly, the actuator is less prone to breakage. Further, the bearings of the hinge lever are less stressed, and hence result in a longer hinge life cycle.

Generally, the hinge arm will be connected to the carcass of a furniture item, and the hinge cup attached to the door. Thus, the hinge arm is typically stationary in the opening and closing action, whilst the hinge cup will move. In any event, there is relative movement between the two sections of the hinge assembly. However, when the hinge assembly is removed from a furniture item, it is perhaps more intuitive to consider that the hinge arm moves with respect to the hinge cup. In the following description, where it is described that the hinge arm moves, it is done so for ease of understanding.

The hinge arm will define a closing path as the hinge assembly moves from an open position to a closed position. The first, second and third positions are preferably points along said closing path. In preferred arrangements the hinge arm may start the closing operation at a point beyond the third position. In other words, the hinge arm may travel for a portion of the closing path before arriving at the third position. Alternatively, the actuator may be positioned so as to engage with either the hinge arm or hinge lever when the hinge assembly is in the open position.

Preferably, the damping device is a linear damper. It is also preferred that the linear damper is mounted so that its primary axis is parallel to the pivot axis of the hinge assembly. In a more preferred arrangement, the hinge cup comprises a flange, and said linear damper is mounted on said flange. A cover may be provided that fits about the flange so as to protect the damping device. The flange may be made integral with the hinge cup, or may be made as a separate piece that engages therewith. In an arrangement the separate flange piece could engage with the hinge cup via a snap-fit connection. However, any suitable connecting means may be used.

In a variation, a cover piece may be made integral with the hinge cup, and a mounting piece to hold the linear damper may be inserted under the cover.

It will also be appreciated that the hinge cup, flange piece and cover could be provided as three separate sections that are operable to be assembled together.

Preferably, the actuator assembly is operable to engage with a transmission means that further engages with the damping device. More preferably, the transmission means comprises first and second pivotally mounted members mounted respective sides of the hinge cup, and moveable from a first position to a second position to cause compression of the linear damper. The transmission members may engage with the camming surfaces on the actuator members.

In a variant, the transmission members may operate by sliding back and forth. In such an arrangement, the damping device and transmission members may be shaped to cooperate during a damping action.

In a preferred arrangement, the actuator is spring loaded, such that it is operable to return to the third position when the hinge assembly moves from a closed position to an open position.

It is preferred that means for determining the magnitude of the damping action is provided. Such means may comprise a mechanism for limiting the path of travel of either the actuator or a member that may engage with the damping device.

Also disclosed is a hinge assembly operable to move from an open position to a closed position, wherein the hinge assembly comprises a hinge cup and a hinge arm, and a damping device activated via an actuator assembly, wherein said actuator assembly comprises an actuator that is pivotally mounted in said hinge cup such that at least a portion of said actuator protrudes from the hinge cup in both the open position and the closed position.

Typically the actuator comprises a crosspiece connected to a pair of legs, wherein said legs are pivotally mounted in the hinge cup, wherein the crosspiece is maintained outside of the hinge cup in both the open and closed position.

The preferred aspects set out above may be configured in any combination.

It will be thus appreciated that, in use, the hinge cup typically rotates during a closing action with respect to the hinge arm in a first direction, and that the actuator assembly rotates from the first position to the second position in the counter direction.

In order that the present arrangement be more readily understood, specific embodiments thereof will now be described with reference to the accompanying drawings.

FIG. 1*a* shows a perspective view of a hinge assembly according to a first embodiment of the present invention, in an open position.

FIG. 1*b* shows the hinge assembly of FIG. 1*a*, but with a cover section removed.

FIG. 1*c* shows the hinge assembly of FIGS. 1*a* and 1*b*, with a mechanism for limiting the damping stroke of a damping device engaged.

FIG. 5 shows a cover piece.

FIG. 6 shows a cover piece integrated with a hinge cup.

FIG. 7 shows a flange as a separate mounting section.

FIG. 8 shows an actuator.

FIGS. 9*a* and 9*b* show engaging members that are operable to engage with the actuator of FIG. 8.

FIG. 10 shows a return spring.

FIG. 11 shows a switch operable to determine the degree of damping available form a damping device.

Figure 12:
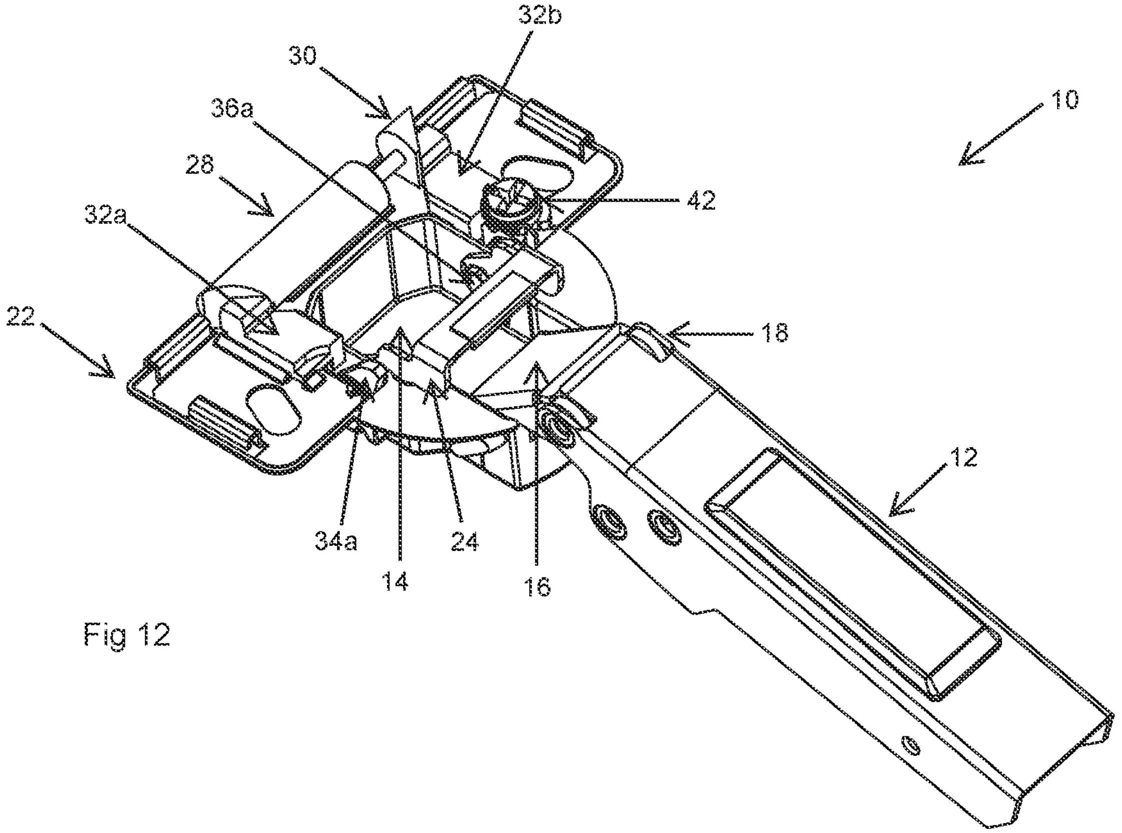

FIG. 12 shows a perspective view of a hinge assembly according to a second embodiment of the present invention, in an open position.

Figure 13:
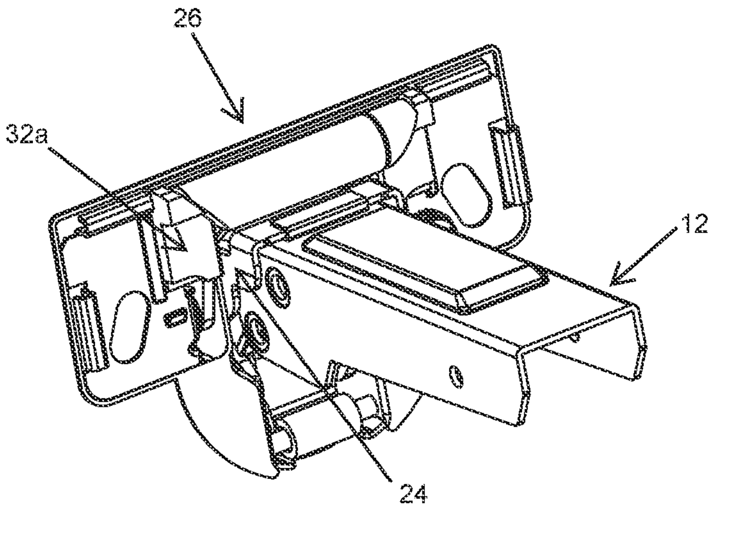

FIG. 13 shows the hinge assembly of FIG. 12 in a closed position.

Figure 1A:
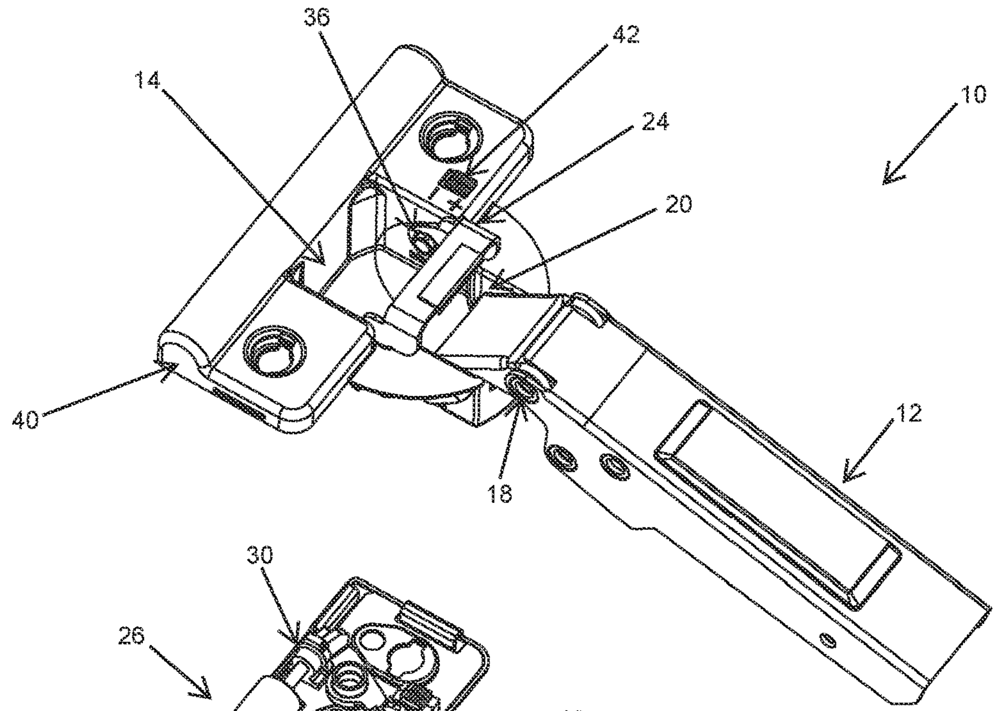
Figure 1B:
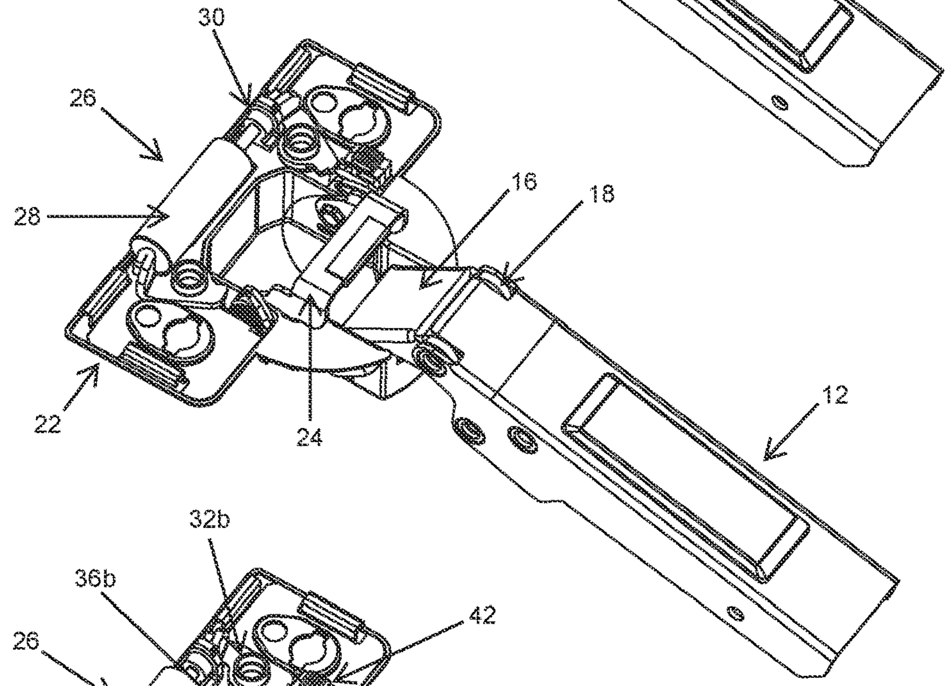

A hinge assembly 10 according to a first embodiment is shown in FIGS. 1*a* to 1*b*. Specifically, FIG. 1*a* shows a hinge assembly 10 with a hinge arm 12 and a hinge cup 14. The hinge arm 12 is connected to the hinge cup 14 via a hinge lever 16. The hinge lever 16 is pivotally connected to the hinge arm 12 at axis 18. The hinge lever 16 is pivotally connected to the hinge cup 14 at axis 20 (the connection is most easily seen from FIG. 6).

Figure 1C:
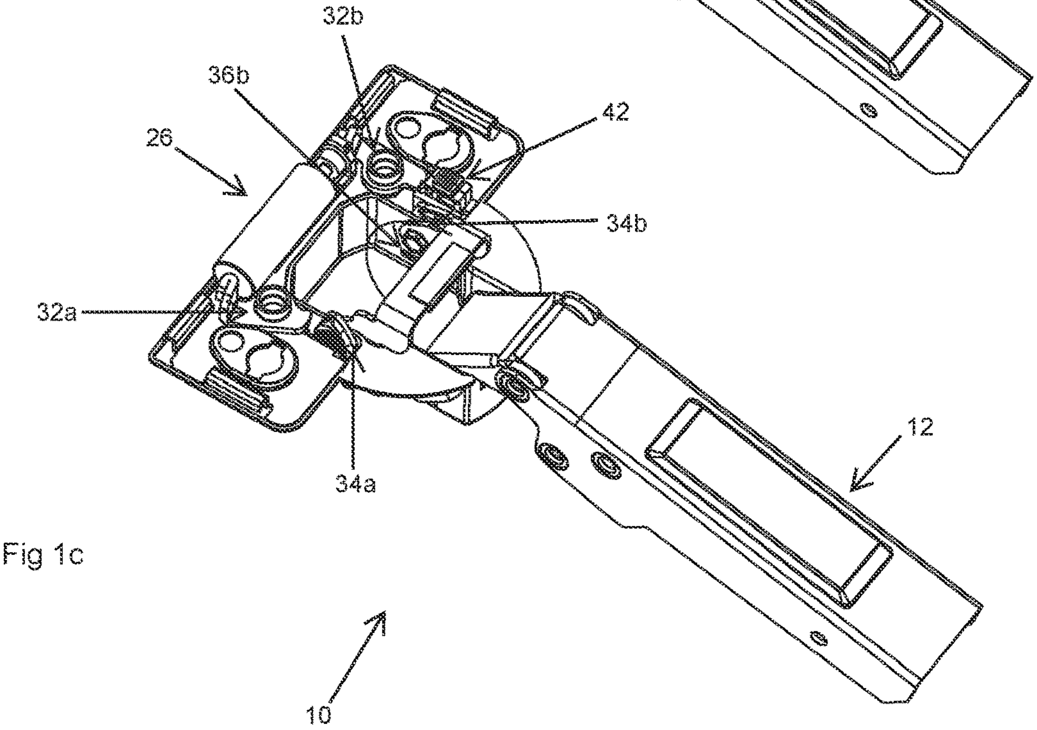

As most easily seen in FIGS. 1*b* and 1*c*, the hinge cup 14 comprises a flange 22. The flange may be made integrally with the hinge cup 14, or be made as a separate piece (as shown in FIG. 7). A cover piece 40 (shown in FIG. 1*a*) is operable to be mounted onto the flange 22. The cover 40 could be made integrally with the hinge cup 14 (as shown in FIG. 6). In this arrangement, the flange 22 (for example comprising a separate mounting section as shown in FIG. 7) could be mounted underneath the cover piece 40.

The cover 40 and flange 22 have cooperating apertures to allow the hinge assembly 10 to be mounted on a piece of furniture.

An actuator 24 is pivotally mounted within the hinge cup 14. The actuator 24 is operable to pivot about axis 36. Axis 36 is parallel with axis 18 and axis 20.

A damping device 26 is mounted on the flange 22. The damping device 26 comprises a damper housing 28 and a piston rod 30. In use the piston rod 30 may be forced into the damper housing 28 against the action of a damper fluid to cause a damping action, in a known manner. The damping device 26 is typically mounted such that the axis of reciprocation of the piston rod 30 is parallel with axes 18 and 20.

The damping device 26 is actioned by a transmission means. Said transmission means comprises first and second transmission members 32*a*, 32*b*, which are pivotally mounted on the flange 22. The first and second transmission members 32*a*, 32*b* are mirror images of one another. They are configured to move about their respective pivots so as to compress the damping device 26.

The actuator 24 is coupled to a pair of actuator members 34*a*, 34*b*. Collectively, the actuator 24 and the actuator members 34*a*, 34*b* may be considered as an actuator assembly. Said actuator members 34*a*, 34*b* are substantially mirror images on one another, and are mounted on respective sides of the hinge cup 14. Actuator members 34*a*, 34*b* are operable to pivot about, respectively, points 36*a* and 36*b* along axis 36. Movement of the actuator 24 causes movement of the actuator members 34*a*, 34*b* about their respective pivot points. Such movement is operable to cause the first and second transmission members 32*a*, 32*b* to compress the damping device 26, or, in other words, is operable to compress the piston rod into the damper housing 28. As the hinge assembly 10 closes, the actuator is rotated about axis 36. This is turn causes rotation of the actuator members 34*a*, 34*b* about, respectively, points 36*a* and 36*b*, which in turn causes rotation of the first and second transmission members 32*a*, 32*b*.

The operation of the actuator 24, first and second transmission members 32*a*, 32*b*, and actuator members 34*a*, 34*b* and their interaction with the damping device will be described in more depth below.

Figure 2:
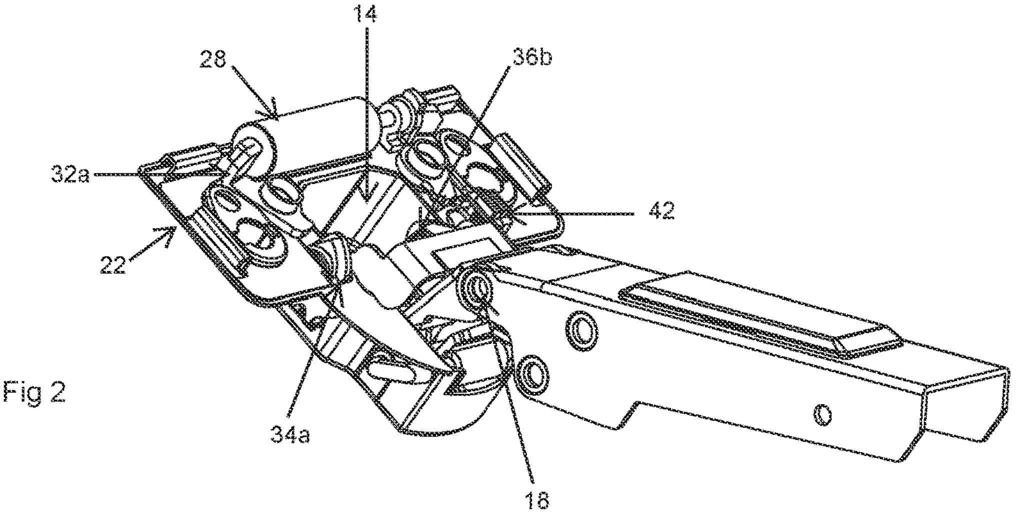
FIG. 2 shows the hinge assembly of FIG. 1 in a position intermediate an open position and a closed position.
Figure 3:
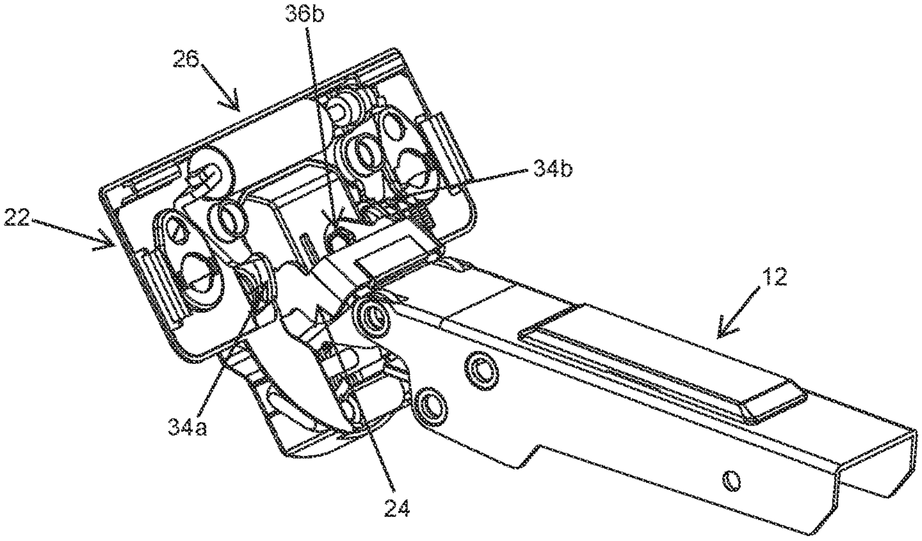
FIG. 3 shows the hinge assembly of FIG. 1 in a second intermediate position.
Figure 4:
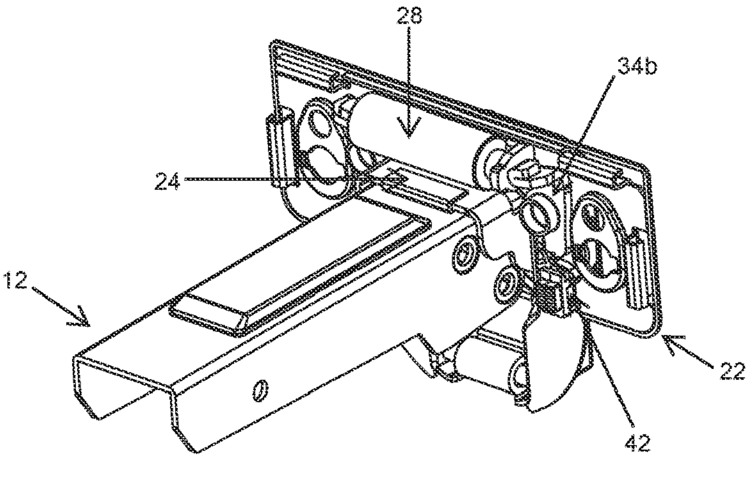
FIG. 4 shows the hinge assembly of FIG. 1 in a closed position.

FIGS. 1 to 4 illustrate the closing operation of the hinge assembly 10. The operation starts with an open position (FIG. 1) and goes through a first intermediate position (FIG. 2), a second intermediate position (FIG. 3) to a closed position (FIG. 4). As described above, the hinge arm 12 is typically anchored to a piece of furniture, whilst the hinge cup 14 is connected to the door. Thus, once the hinge assembly 10 is in situ, the hinge arm 12 will be substantially stationary in the opening and closing action. The hinge cup will move as the door moves. To aid understanding, the drawings show the hinge cup as stationary, with the hinge arm 12 in motion. This is merely for ease of understanding. It will be appreciated that in either scenario, it is the relative motion of the two sections of the hinge assembly 10 that is important.

In the open position the hinge arm 12 and hinge lever 16 are disengaged with the actuator 24. Put another way, there is no contact between the actuator 24 and either the hinge arm or the hinge lever in the open position.

In the first intermediate position the hinge lever 16 engages the actuator 24. In this position, the actuator members 34*a*, 34*b* are spaced apart from first and second transmission members 32*a*, 32*b*. Accordingly, for the first part of travel of the hinge arm 12, the hinge arm 12 and hinge lever 16 and disengaged with the actuator assembly. In the subsequent portion of the path of travel of the hinge arm 12, the hinge lever 16 engages with the actuator 24, but said actuator assembly is not engaged with the transmission means.

In the second intermediate position, the actuator 24 has slid across the hinge lever 16 and now engages the hinge arm 12. At this point actuator members 34*a*, 34*b* engage first and second transmission members 32*a*, 32*b*. Accordingly, only in the second intermediate, when the actuator 24 has ceased contact with the hinge lever 16, and is engaged with the hinge arm 12 does the actuation assembly engage with the transmission means. It is at this position that the damping action begins.

It will be appreciated that the actuator 24 rotates about axis 36 towards the flange 22. In this arrangement it can be seen that the actuator rotates in the same relative direction as the hinge arm 12. From the point of view of the hinge cup 14, the actuator 24 will rotate in the counter-direction.

FIG. 4 shows the hinge assembly 10 in its closed position. Here, the actuator assembly has been rotated to its maximum extent. The actuator members 34*a*, 34*b* have fully rotated, and caused the first and second transmission members 32*a*, 32*b* to fully compress the damping device 26, and cause the damping action.

It will be appreciated that, in all stages, at least a portion of the actuator 24 remains outside of the hinge cup.

The arrangement of FIGS. 1 to 4 also comprises means to control the amount of damping action. A slide switch 42 is provided. The switch 42 is operable to move between first and second positions. In the first position, shown in FIGS. 1*a* and 1*b*, allows the damping to occur as described above. In the second position (shown in FIG. 1*c*) the slide switch 42 is pushed forward and engages one of the transmission members 32*b*. It will be appreciated that the switch 42 is illustrated mounted on the flange to the right of the hinge cup 14, but it could just as easily be mounted to the left. In the second position the slide switch prevents all or some of the movement of the transmission member 32*b*. Accordingly, the damping device 26 is compressed only by action of one of the transmission members 32*a*. As such the damping action is caused with only half the force. In a variant, the slide switch 42 may be configured to block a portion of movement of a transmission member (and hence a portion of movement of the piston rod). Accordingly, it may be configured to provide a lower damping force at the beginning of the damping stroke.

FIGS. 5 to 10 show components of the hinge assembly 10 in more detail.

FIGS. 5 to 7 show an example of a cover piece 40 (FIG. 5), a hinge cup 14, showing an integrated cover piece 40 (FIG. 6) and a separate flange mounting piece 22 (FIG. 7). As mentioned above, the hinge cup 14 can be made integrally with either the cover 40 or the flange 22, or as separate pieces. In all cases, ideally mounting apertures are provided.

An example of an actuator 24 is shown in FIG. 8. The actuator 24 is substantially U-shaped to allow it to fit about either the hinge lever 16 or hinge arm 12 during engagement. Thus the actuator 24 comprises a crosspiece and two legs. As will be seen in FIG. 4, the actuator 24 sits snugly against the hinge arm 12 when the hinge assembly 10 is in the closed position. Such an arrangement ensures that the actuator is protected, and cannot be easily damaged. This arrangement also allows the hinge cup to be made smaller. The actuator does not finish inside the hinge cup, and hence additional room in the hinge cup to accommodate the actuator is not required.

The actuator 24 is operable to slide over the hinge lever 16 during an initial section of the closing action. The crosspiece of the actuator 24 may be shaped, or made from a specific material, to aid said sliding movement.

Actuator 24, together with actuator members 34*a*, 34*b*, defines the actuator assembly. The actuator members 34*a*, 34*b* are shown in FIGS. 9*a* and 9*b*. Each actuator member comprises a hexagonal hub 60. These hubs can pass through apertures 46 (see FIG. 6) in the hinge cup 14. Apertures 46 are aligned with axis 36. The hubs 60 can then engage with corresponding hexagonal slots 62 in the legs of the actuator 24. In this arrangement rotation of the actuator causes corresponding rotation of the actuator members 34*a*, 34*b*. In an alternative arrangement, slots may be provided on both the legs of the actuator 24 and on the actuator members 34*a*, 34*b*, with separate pins provided as connecting parts.

It will be appreciated that the hubs 60 could be disposed on the actuator 24, and the slots 62 on the actuator members 34*a*, 34*b*. The hubs 60 need not be hexagonal, and any shape is contemplated. However, it is preferred that a non-circular shape is selected to ensure that rotation of the actuator 24 is transmitted to the actuator members 34*a*, 34*b* with limited slippage.

Save for a protrusion on one of the actuator members 34*a* (discussed below), the two actuator members are preferably mirror images of one another. Each of the actuator members comprises a camming surface 54 operable to engage with respective transmission members. As the actuator members 34*a*, 34*b* are rotated, the camming surfaces 54 force the transmission members 32*a*, 32*b* to pivot about their respective pivot points, and compress the damping device 26. In a particularly desired arrangement, the camming surfaces 54 could be provided with a variable pitch. Such an arrangement allows for the damping action to varied during the closing action. For example, the damping force could be increased during the closing action.

The actuator assembly is biased into the position shown in FIG. 1 by a spring 48, shown in FIG. 10. The spring 48 is a coil spring, and comprises a first arm 50 that engages with the hinge assembly inside the hinge cup 14. A second arm 52 is provided. It is preferred that said arm is shaped to engage with a protrusion 70 located on one of the actuator members 34*a*, 34*b*. Accordingly, as the hinge assembly 10 moves from a closed position to an open position, the actuator 24 is biased back to a position to begin the damping action in the next closing action.

The damping device 26 comprises an internal spring (not shown) that urges the piston rod back out of the damper housing. This spring is sufficient to reset the transmission members 32*a*, 32*b* to their original location (as shown in FIGS. 1 to 3).

Thus, the present arrangement provides for a hinge assembly 10 that actions the damping function with the hinge arm 12, rather than the hinge lever 16. Thus a more robust portion of the hinge assembly 10 is used to action the damping device 26. Accordingly, the working life of the hinge assembly 10 can be prolonged.

Further, because the hinge lever 16 is used to urge the actuator 24 into position, noting that the actuator 24 is, at this point, disengaged with the transmission means, the actuator can be made smaller and hence less prone to breakage.

When the hinge assembly is in the closed position, the actuator 24 is maintained is least partially outside of the hinge cup. As such, room does not need to be made in the hinge cup to house the actuator, and hence the hinge cup may be made smaller.

A variant is disclosed in FIGS. 12 and 13. The same comments regarding possible hinge assembly 10 combinations of hinge cup 16, cover 40 and flange 22 apply here; they may be made as three separate pieces, or some may be made integrally with others.

In this arrangement, the transmission members 32*a*, 32*b* are operable to slide back and forth in a direction perpendicular to the axis of the damping device 26. The ends of the transmission members 32*a*, 32*b* that engage with the damping device 26 present at substantially 45° to the damping device 26. The damper housing and piston rod are correspondingly shaped at substantially 45°, such that as the transmission members 32*a*, 32*b* slide forward the damping device is squeezed together to provide the damping function. Such an arrangement is clearly shown in FIGS. 12 and 13.

In this arrangement the actuator 24 rotates the actuator members, as in the first embodiment, and pushes the transmission members 32*a*, 32*b* so as to compress the damping device 26.

In a further variant, the means to control the extent of the damping function is provided by way of a screw. The means 42 is operable to determine the starting point of one of the transmission members 32*b*. Such a means allows control of how much the damping device is compressed as the hinge assembly 10 is moved into a closed position.

The above described embodiments are provided for information only, and many variations are possible within the scope of the attached claims.

The invention claimed is:

1. A hinge assembly comprising:
- a hinge cup;
- a hinge arm;
- a hinge lever pivotally connected to both the hinge cup and the hinge arm so as to connect the two together;
- a damping device;
- an actuator assembly operable to activate the damping device as the hinge assembly moves from an open position to a closed position,
- wherein the actuator assembly comprises an actuator that is pivotally mounted inside the hinge cup;
- wherein, as the hinge assembly moves from the open position to the closed position:
  - the hinge lever is operable to engage with the actuator assembly beginning at a third position of the actuator assembly and causes the actuator assembly to move to a second position, and
  - the hinge arm is operable to engage with the actuator assembly beginning at the second position of the actuator assembly and cause the actuator assembly to move to a first position to actuate the damping device, and
- wherein the second position is intermediate between the third and first positions.

2. A hinge assembly according to claim 1, wherein the actuator has a primary axis of rotation that is parallel to a pivot axis of the hinge assembly.

3. A hinge assembly according to claim 2, wherein the damping device is mounted so that its primary axis is parallel to the pivot axis of the hinge assembly.

4. A hinge assembly according to claim 1, wherein the actuator remains at least partially out of the hinge cup when the hinge assembly is in the closed position.

5. A hinge assembly according to claim 4, wherein the hinge cup comprises a flange, and said damping device is mounted on said flange.

6. A hinge assembly according to claim 5, wherein the flange is integrally formed with the hinge cup.

7. A hinge assembly according to claim 1, wherein the actuator assembly is operable to engage with a transmission means that further engages with the damping device.

8. A hinge assembly according to claim 7, wherein the transmission means comprises first and second pivotally mounted members mounted respective sides of the hinge cup, and moveable from the first position to the second position to cause compression of the damping device.

9. A hinge assembly according to claim 1, wherein the actuator assembly is spring loaded, such that it is operable to return to the third position when the hinge assembly moves from the closed position to the open position.

10. A hinge assembly according to claim 1, wherein the damping device is a linear damper.

11. A hinge assembly according to claim 1, wherein the actuator assembly is operable to move from the third position to the second position without activating the damping device.

12. A hinge assembly according to claim 1, wherein the actuator assembly comprises the actuator and a pair of actuator members.

13. A hinge assembly according to claim 12, wherein the pair of actuator members comprise camming surfaces with a variable pitch.

14. A hinge assembly according to claim 1, wherein, in use, the hinge cup rotates during a closing action with respect to the hinge arm in a first direction, and that the actuator assembly rotates from the second position to the first position in a counter direction.

* * * * *